(12) United States Patent
Zhang et al.

(10) Patent No.: US 9,762,398 B2
(45) Date of Patent: Sep. 12, 2017

(54) APPLICATION-BASED TOLL-FREE DATA SERVICE

(71) Applicant: Verizon Patent and Licensing Inc., Arlington, VA (US)

(72) Inventors: Gong Zhang, Waltham, MA (US); Jian Huang, Sudbury, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 84 days.

(21) Appl. No.: 14/884,013

(22) Filed: Oct. 15, 2015

(65) Prior Publication Data

US 2017/0111174 A1  Apr. 20, 2017

(51) Int. Cl.
*H04L 29/06* (2006.01)
*H04L 9/32* (2006.01)
*H04L 29/08* (2006.01)
*G06Q 40/00* (2012.01)

(52) U.S. Cl.
CPC ........... *H04L 9/3247* (2013.01); *G06Q 40/12* (2013.12); *H04L 63/0428* (2013.01); *H04L 67/02* (2013.01); *H04L 2209/72* (2013.01)

(58) Field of Classification Search
CPC ... H04L 9/3247; H04L 67/02; H04L 63/0428; H04L 2209/72; G06Q 40/12
USPC ........................................................ 713/176
See application file for complete search history.

(56) References Cited

U.S. PATENT DOCUMENTS

| | | | |
|---|---|---|---|
| 7,100,821 B2* | 9/2006 | Rasti | G06Q 20/10 235/379 |
| 8,737,973 B1* | 5/2014 | Petrunka | H04M 3/42306 379/114.24 |
| 2005/0216421 A1* | 9/2005 | Barry | G06F 11/0709 705/64 |
| 2010/0082431 A1* | 4/2010 | Ramer | G06Q 30/02 705/14.52 |
| 2012/0036051 A1* | 2/2012 | Sachson | G06Q 40/12 705/30 |
| 2013/0124211 A1* | 5/2013 | McDonough | H04L 12/5895 704/275 |
| 2014/0098671 A1* | 4/2014 | Raleigh | H04M 15/80 370/235 |
| 2014/0344405 A1* | 11/2014 | Sachson | G06Q 30/0224 709/217 |
| 2016/0239825 A1* | 8/2016 | Nandakumar | G06Q 20/385 |
| 2017/0006451 A1* | 1/2017 | Mandanapu | H04L 43/028 |

* cited by examiner

*Primary Examiner* — Mahfuzur Rahman (57) ABSTRACT

A first device may receive a toll-free data request that includes an application signature. The toll-free data request may request that a first entity be billed for data usage by a second device associated with a second entity, and may be received from an application. The first device may decrypt the application signature to obtain a device identifier and an application identifier. The first device may validate the application signature based on the device identifier and the application identifier. The first device may selectively cause the first entity or the second entity to be billed for data usage associated with the toll-free data request based on a result of validating the application signature.

20 Claims, 7 Drawing Sheets

APPLICATION-BASED TOLL-FREE DATA SERVICE

BACKGROUND

Service providers, such as online media companies, may wish to deliver content to network users. Some service providers may choose to subsidize the cost of network data usage which would otherwise be paid by the network users accessing the content.

DETAILED DESCRIPTION OF PREFERRED EMBODIMENTS

The following detailed description of example implementations refers to the accompanying drawings. The same reference numbers in different drawings may identify the same or similar elements.

A service provider may want to provide content to a network user. The service provider may want to subsidize the cost of network data usage which would ordinarily be charged to the network user to access the content. For a network device to recognize that the content is to be subsidized, the service provider may associate particular information with the content. For example, the service provider may append a tag to each web address that is associated with content to be subsidized. However, attaching a tag to each web address may be cumbersome and time-consuming in situations where many web addresses are to be tagged.

Implementations described herein permit one or more network devices to provide an application signature to a toll-free service provider. The toll-free service provider may configure an application to attach the application signature to network traffic that is associated with content to be subsidized. In some implementations, the application may attach the application signature as the network traffic is transmitted. In this way, the one or more network devices save time and effort on the part of the toll-free service provider and processor and/or storage resources that would otherwise be used to tag individual web addresses. The one or more network devices may validate the network traffic based on the application signature to determine that the network traffic originates from an authorized client device and application, which improves network security and prevents unauthorized parties from accessing the content to be subsidized.

Figure 1A:
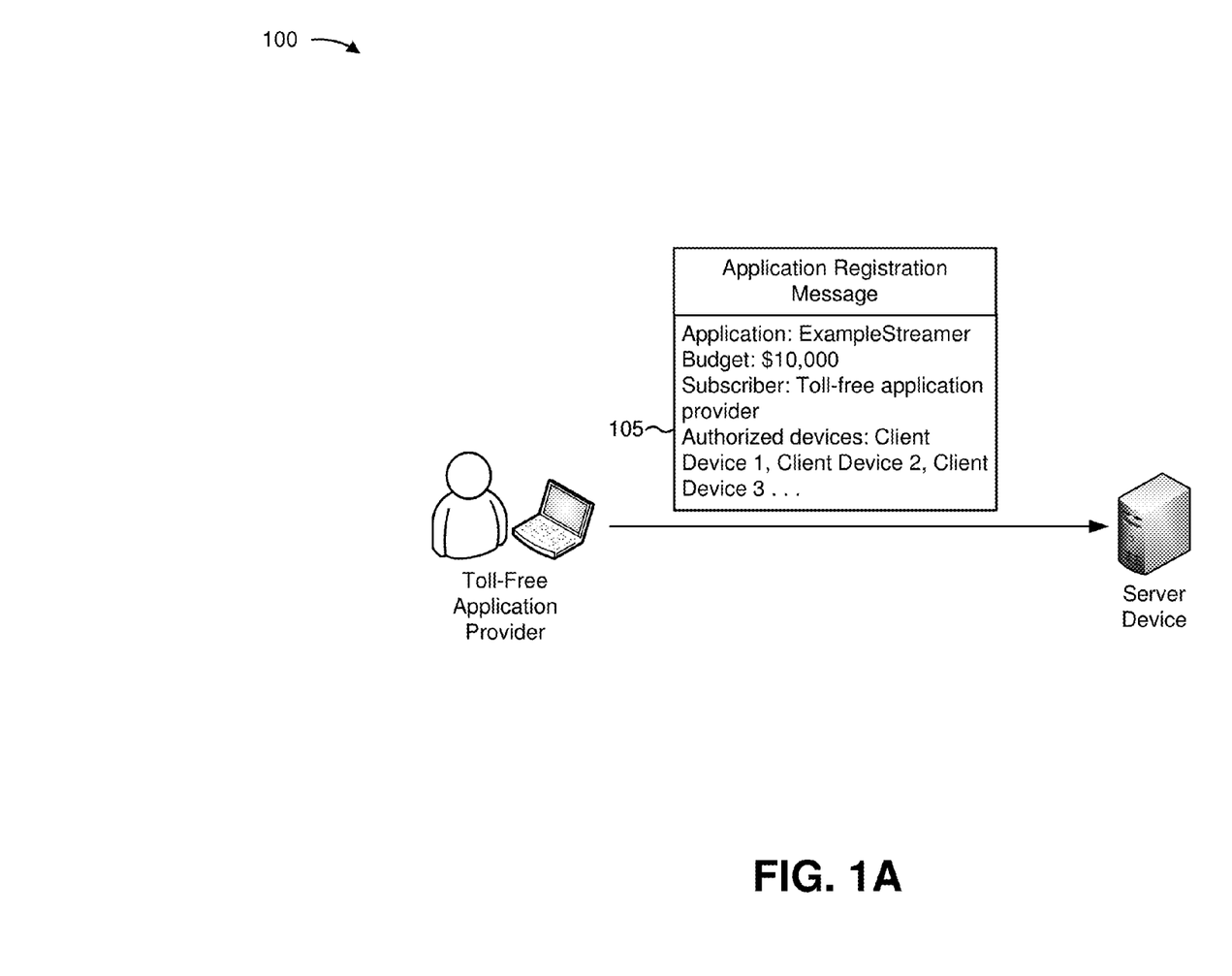
FIGS. 1A-1C are diagrams of an overview of an example implementation described herein.
Figure 1B:
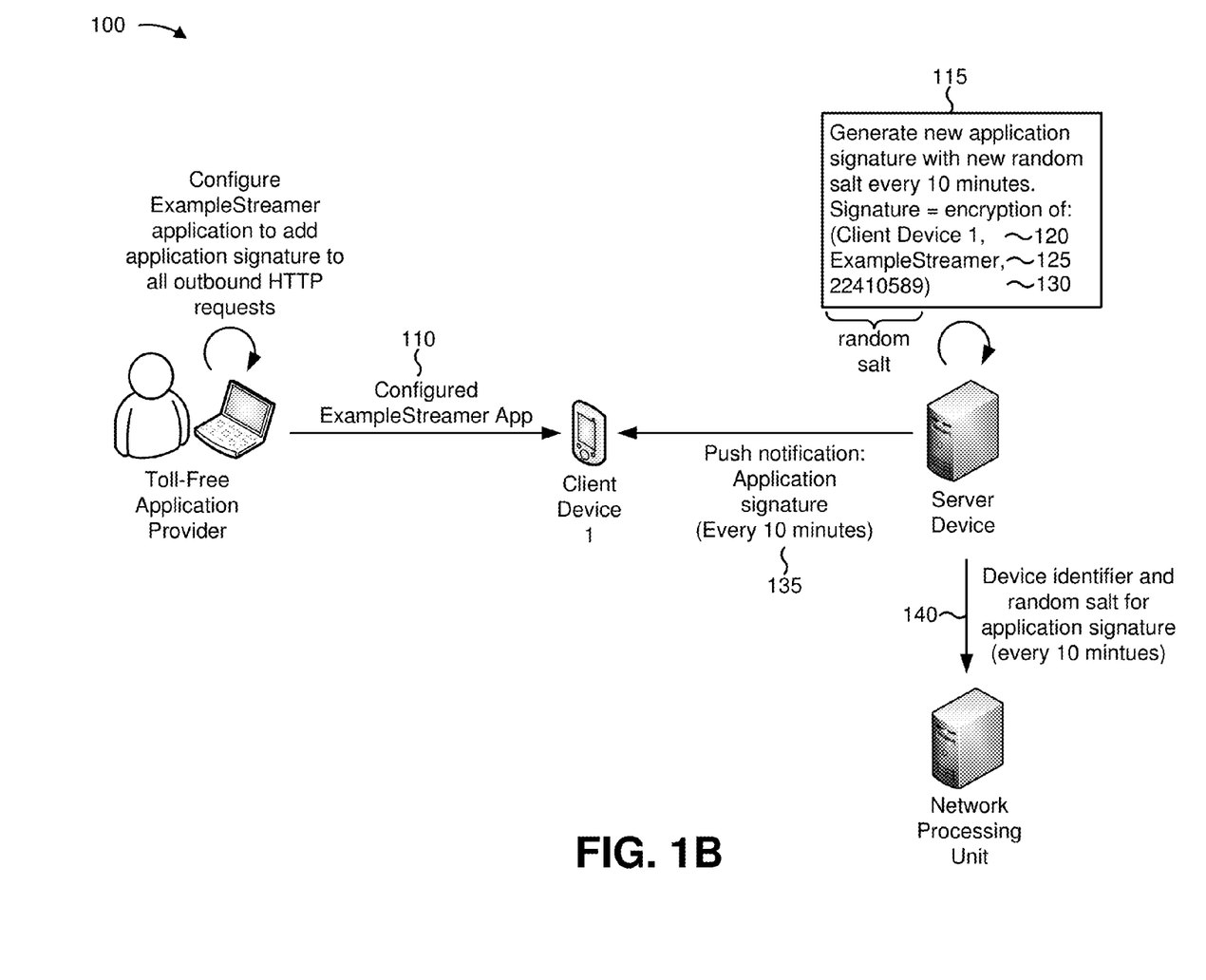
Figure 1C:
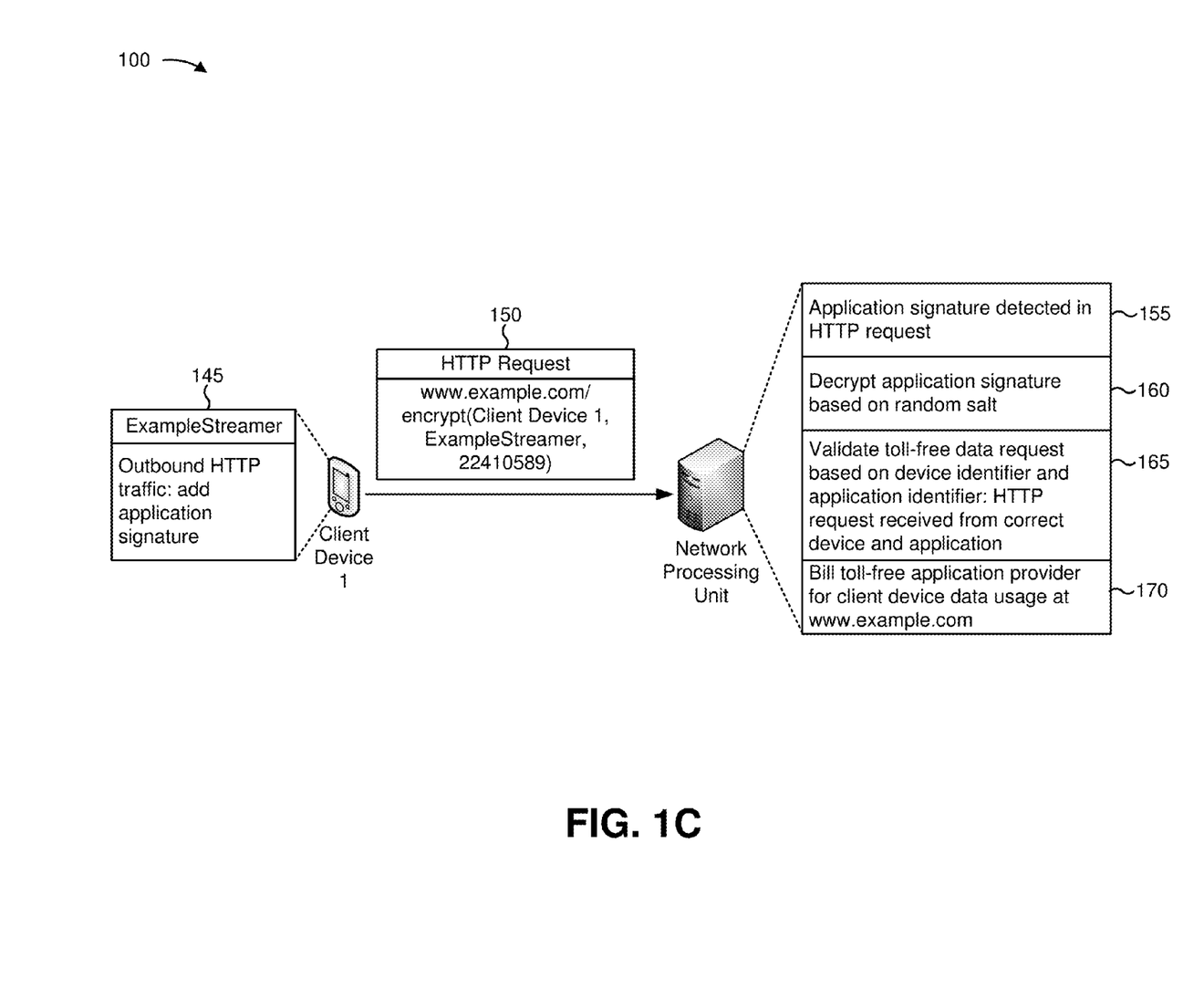

FIGS. 1A-1C are diagrams of an overview of an example implementation 100 described herein. As shown in FIG. 1A, and by reference number 105, a toll-free application provider may transmit an application registration message to a server device to register an application with regard to a toll-free data service. As further shown, the application registration message may include an application identifier (e.g., "ExampleStreamer"), a budget for the toll-free data service (e.g., $10,000), information identifying a subscriber to bill for the toll-free data service (e.g., Toll-free application provider), and a list of device identifiers authorized to access the toll-free data service via the application (e.g., Client Device 1, Client Device 2, Client Device 3, and so on).

As shown in FIG. 1B, the toll-free application provider may configure the ExampleStreamer application to add an application signature to all outbound HTTP requests. In this way, the toll-free application provider conserves time, effort, and processor resources that may otherwise be used to modify each network address that is associated with toll-free content (e.g., each uniform resource locator, each uniform resource identifier, etc.) to include information identifying the toll-free data service. As shown by reference number 110, the toll-free application provider may provide the configured ExampleStreamer application to Client Device 1.

As shown by reference number 115, the server device may generate the application signature based on a particular time interval (e.g., every ten minutes). As further shown, the server device may generate the application signature based on an encryption string (e.g., a random salt) that is generated based on the particular time interval. As shown, the server device may generate the application signature by encrypting the device identifier (e.g., Client Device 1, as shown by reference number 120), the application identifier (e.g., ExampleStreamer, as shown by reference number 125), and the random salt (e.g., 22410589, as shown by reference number 130).

As shown by reference number 135, the server device may provide the application signature to Client Device 1 in a push notification. By providing the application signature in the push notification, the server device reduces a likelihood that a malicious party intercepts the application signature, which improves security of the network. As further shown, the server device may provide the application signature to Client Device 1 based on the particular time interval. By providing the application signature every ten minutes (for example), the server device improves network security by reducing an amount of time that a malicious party can use the application signature. As shown by reference number 140, the server device may provide the device identifier (e.g., Client Device 1) and the random salt to a network processing unit. Assume that the network processing unit stores the device identifier and the random salt.

As shown in FIG. 1C, and by reference number 145, Client Device 1 may execute the ExampleStreamer application. Assume that a user of Client Device 1 attempts to access content, via the application, that is associated with the toll-free data service. As shown, based on the content being accessed via the application, Client Device 1 may add the application signature to outbound hypertext transfer protocol (HTTP) traffic (e.g., HTTP requests, etc.). As shown by reference number 150, Client Device 1 may provide an HTTP request and the application signature to the network processing unit.

As shown by reference number 155, the network processing unit may detect the application signature in the HTTP request. As shown by reference number 160, the network processing unit may decrypt the application signature. For example, the network processing unit may apply a decryption algorithm, based on the random salt, to decrypt the application signature. In some implementations, the network processing unit may obtain the random salt from storage based on the random salt being associated with Client Device 1. By decrypting the application signature, the network processing unit obtains the application identifier and the device identifier included in the application signature.

As shown by reference number 165, the network processing unit may validate the toll-free data request based on the device identifier and the application identifier. For example, the network processing unit may determine whether the HTTP request originates from the device that is associated with the device identifier included in the application signature, and whether the HTTP request is associated with the application identified by the application identifier. As shown, the network processing unit may determine that the HTTP request was received from the correct device (e.g., Client Device 1) and the correct application (e.g., ExampleStreamer). In this way, the network processing unit improves security of the toll-free data service by ensuring that requests for content associated with the toll-free data service originate from the correct device and application.

As shown by reference number 170, the network processing unit may cause a device to bill the toll-free application provider for data usage, by Client Device 1, with regard to the content associated with the network address of www.example.com. In this way, the network processing unit improves network security by validating whether requests for toll-free content are received from the correct application and device. Further, the server device saves time and processor resources for the toll-free application provider by eliminating the need for the toll-free application provider to modify individual network addresses to associate the individual network addresses with the toll-free data service.

As indicated above, FIGS. 1A-1C are provided merely as an example. Other examples are possible and may differ from what was described with regard to FIGS. 1A-1C.

Figure 2:
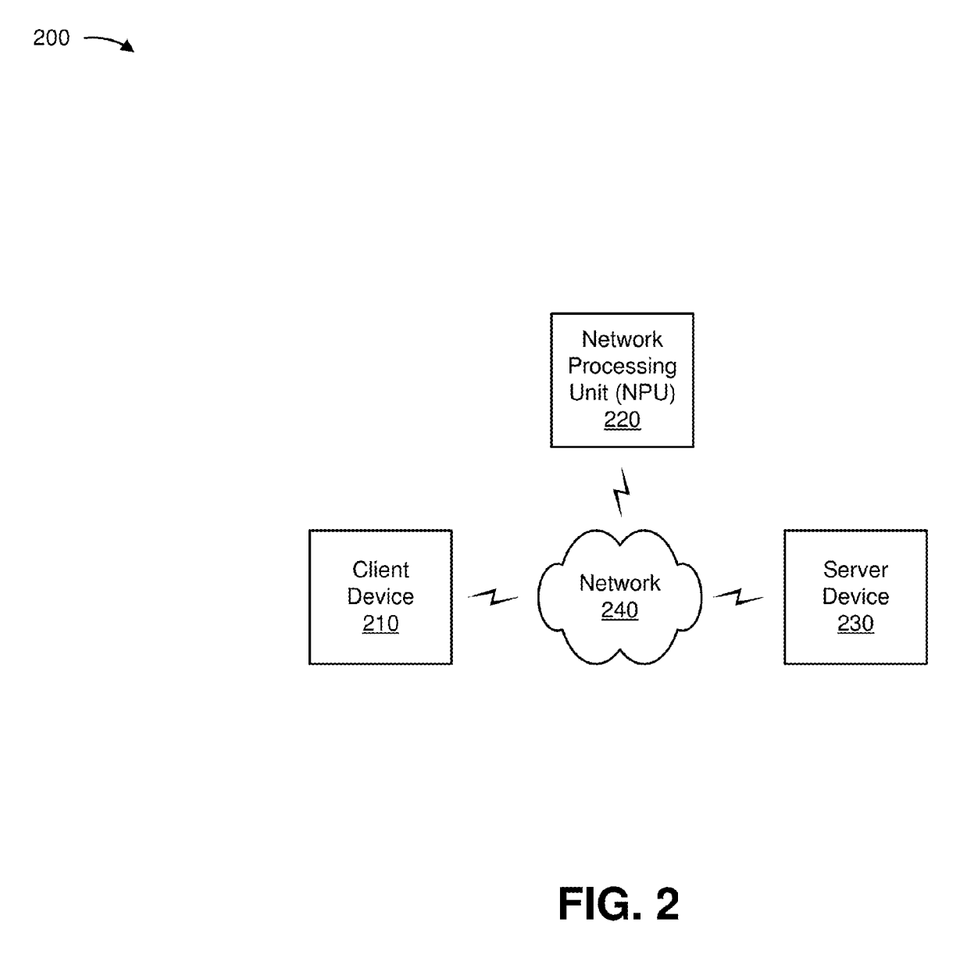
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a network processing unit 220, a server device 230, and a network 240. Devices of environment 200 may interconnect via wired connections, wireless connections, or a combination of wired and wireless connections.

Client device 210 may include one or more devices capable of receiving, generating, storing, processing, and/or providing information. For example, client device 210 may include a communication and computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, client device 210 may receive information from and/or transmit information to another device in environment 200.

Network processing unit 220 may include one or more devices capable of receiving, processing, storing, and/or transferring traffic associated with network 240. For example, network processing unit 220 may include a server, a gateway, a firewall, a router, a switch, a hub, or a similar device. In some implementations, network processing unit 220 may receive information from and/or transmit information to another device in environment 200.

Server device 230 may include one or more devices capable of receiving storing, generating, processing, and/or providing information. For example, server device 230 may include a server, or a similar device. In some implementations, server device 230 may include a communication interface that allows server device 230 to receive information from and/or transmit information to other devices in environment 200.

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
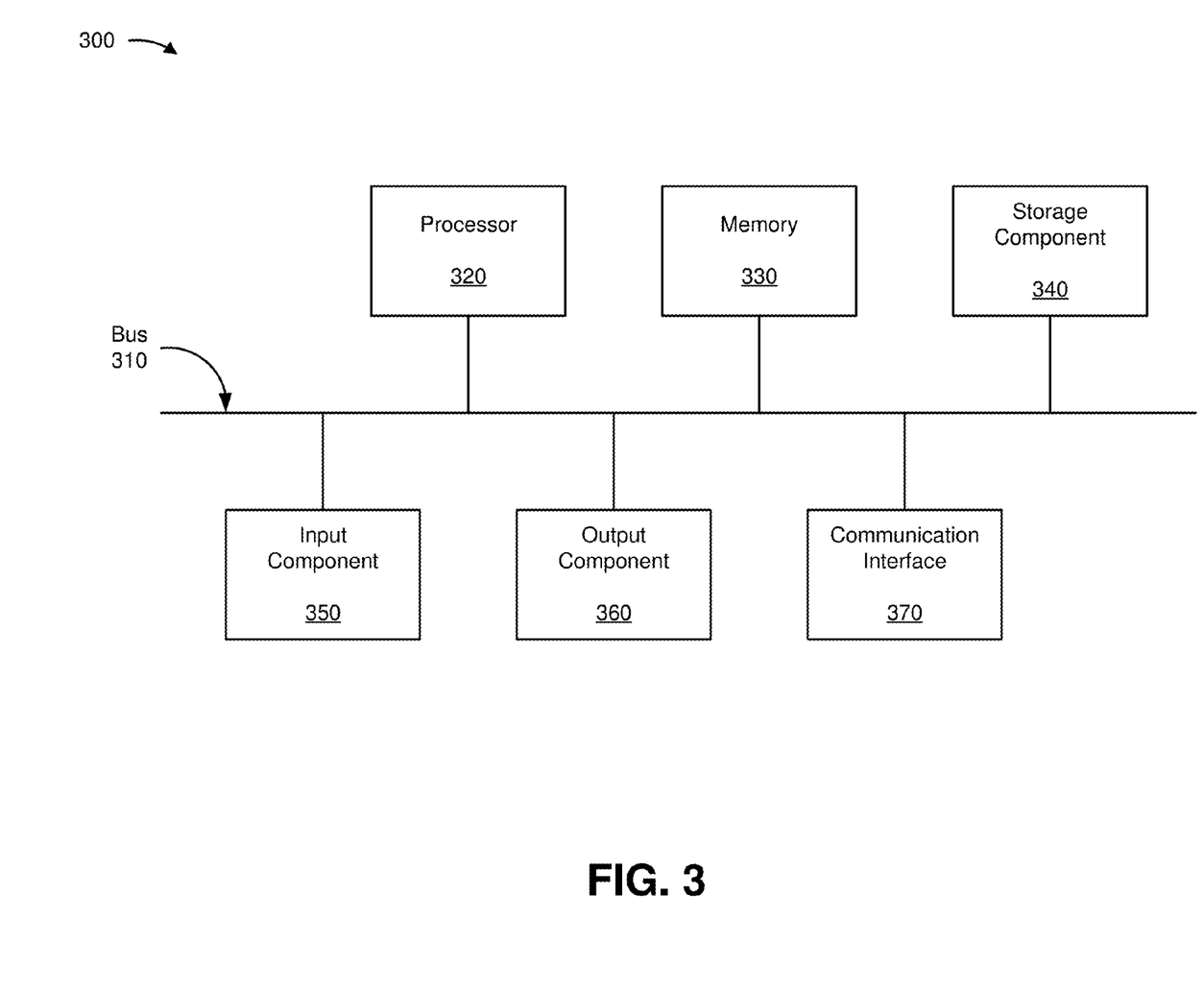
FIG. 3 is a diagram of example components of one or more devices of FIG. 2.

FIG. 3 is a diagram of example components of a device 300. Device 300 may correspond to client device 210, network processing unit 220, and/or server device 230. In some implementations, client device 210, network processing unit 220, and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
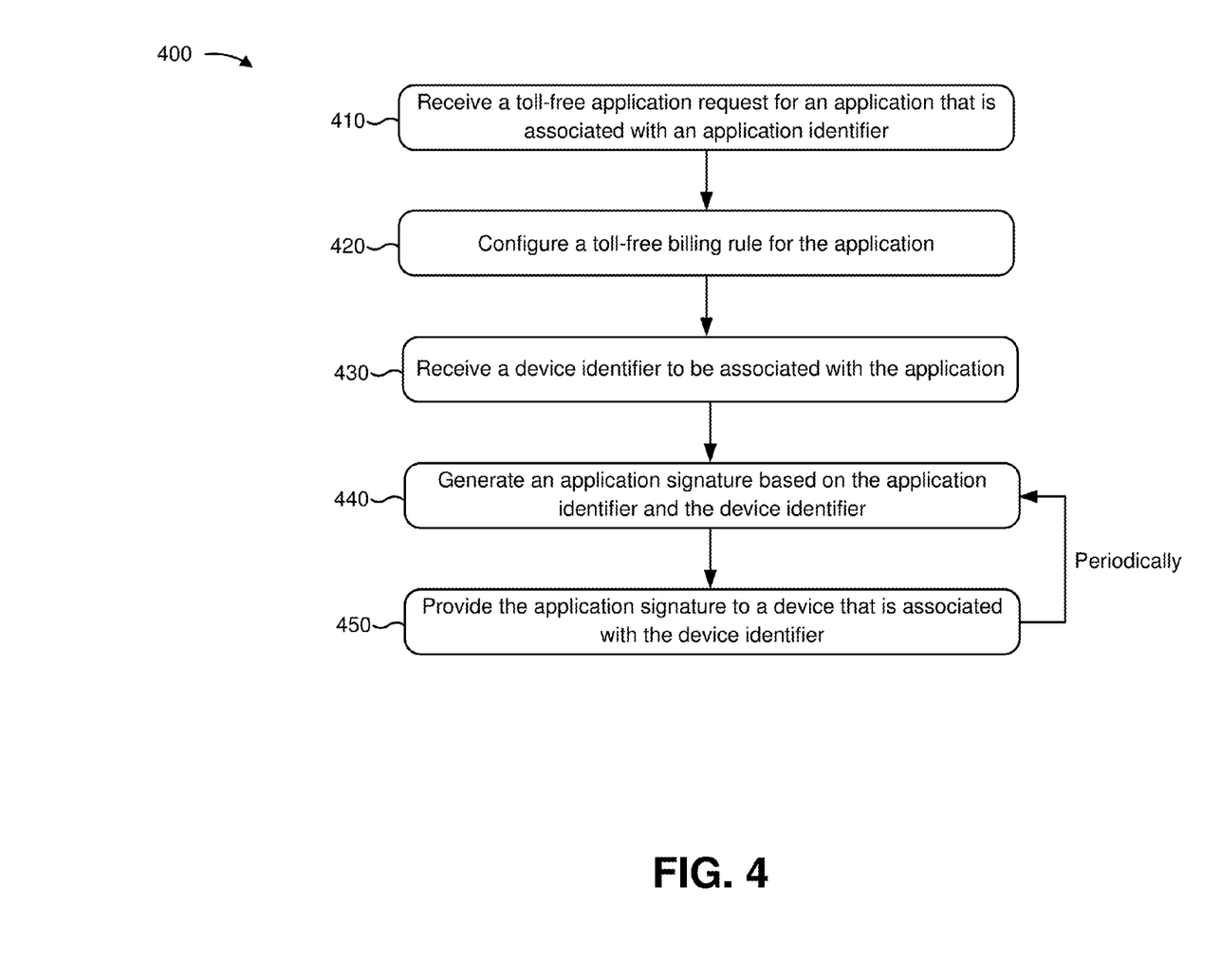
FIG. 4 is a flow chart of an example process for configuring a toll-free data service for an application.

FIG. 4 is a flow chart of an example process 400 for configuring a toll-free data service for an application. In some implementations, one or more process blocks of FIG. 4 may be performed by server device 230. In some implementations, one or more process blocks of FIG. 4 may be performed by another device or a group of devices separate from or including server device 230, such as client device 210 and/or network processing unit 220.

As shown in FIG. 4, process 400 may include receiving a toll-free application request for an application that is associated with an application identifier (block 410). For example, server device 230 may receive a toll-free application request. The toll-free application request may request a toll-free data service for data that is associated with (e.g., provided by, requested by, en route to, received from, etc.) an application that is executed on client device 210. When the application causes data to be transmitted via network 240, network processing unit 220 may detect that the data is associated with the application, and may bill an entity associated with the application, rather than an entity associated with client device 210, as described in more detail below.

The application may be associated with an application identifier. For example, an application provider may provide the application identifier in the toll-free application request. As another example, server device 230 may generate the application identifier based on receiving the toll-free application request. As yet another example, server device 230 may obtain the application identifier from another device based on receiving the toll-free application request. In some implementations, the application identifier may include a string of one or more characters. In some implementations, the application identifier may be unique (e.g., not shared by any two applications).

In some implementations, the toll-free application request may indicate an entity to bill for data usage that is associated with the application. For example, the toll-free application request may specify a particular subscriber (e.g., based on an account number of the particular subscriber, an International Mobile Subscriber Identity (IMSI) of the particular subscriber, or the like), a particular account identifier, a particular credit card number, or the like.

In some implementations, the toll-free application request may include a budget for the toll-free data service. For example, the application provider may specify a monetary amount (e.g., in dollars, in dollars per week, in dollars per user, etc.), and the toll-free data service may bill data usage to a toll-free application provider until the monetary amount has been expended. After the monetary amount has been expended, the toll-free data service may bill a user associated with client device 210. As another example, the budget may specify a particular quantity of times to permit access to toll-free content by the application. Network processing unit 220 may bill the specified entity until the toll-free content has been accessed the quantity of times, and thereafter may bill client device 210 for accessing the toll-free content.

In some implementations, the toll-free application request may identify a geographic location for the toll-free data service. For example, the toll-free application request may identify boundaries of an area in which to provide the toll-free data service, a particular region (e.g., a city, a state, a country, a building, a park, etc.) in which to provide the toll-free data service, or the like. In some implementations, the toll-free application request may identify a time period (e.g., an expiration time, a recurring time, such as every Tuesday, for the first week of each month, every day after 5 pm, etc.) during which to provide the toll-free data service. In some implementations, the toll-free application request may identify a particular type of client device 210 to which to provide the toll-free data service (e.g., a particular brand of phone, a particular firmware, a particular operating system, etc.).

As further shown in FIG. 4, process 400 may include configuring a toll-free billing rule for the application (block 420). For example, server device 230 may configure a toll-free billing rule for the application. The toll-free billing rule may state which entity to bill when certain conditions are met. For example, when network processing unit 220 successfully validates an application signature for a toll-free data service, network processing unit 220 may bill the subscriber associated with the toll-free data service. As another example, when network processing unit 220 does not successfully validate an application signature (e.g., based on the application identifier being incorrectly generated, based on the budget for the toll-free data service having been exceeded, based on the application identifier being forged or tampered with, based on the application identifier being corrupted in transit, etc.), network processing unit 220, or another device, may bill a subscriber associated with client device 210.

In some implementations, the toll-free billing rule may relate to a budget for a toll-free data service. For example, the toll-free billing rule may cause a toll-free data subscriber to be billed when a particular budget has not been expended, and may cause a subscriber associated with client device 210 to be billed otherwise. In some implementations, the toll-free billing rule may relate to a particular time period. For example, the toll-free billing rule may cause a toll-free data subscriber to be billed when data usage occurs within the particular time period (e.g., a recurring time period, an expiration time, etc.), and may cause a subscriber associated with client device 210 to be billed otherwise. In some implementations, the toll-free billing rule may relate to a particular area. For example, the toll-free billing rule may cause a toll-free data subscriber to be billed when data usage occurs within the particular area, and may cause a subscriber associated with client device 210 to be billed otherwise. In some implementations, the toll-free billing rule may relate to a type of client device 210. For example, the toll-free billing rule may cause a toll-free data subscriber to be billed when a particular type of client device 210 accesses the toll-free content, and may bill a subscriber associated with client device 210 otherwise.

As further shown in FIG. 4, process 400 may include receiving a device identifier to be associated with the application (block 430). For example, server device 230 may obtain a device identifier that identifies client device 210. For example, the device identifier may include an international mobile subscriber identity (IMSI), an international mobile station equipment identity (IMEI), a mobile device number (MDN), a subscriber identifier that identifies a subscriber associated with client device 210, or the like. In some implementations, server device 230 may obtain multiple device identifiers. For example, server device 230 may receive information in the toll-free application request identifying multiple client devices 210 that are permitted to access the toll-free data (e.g., as a set of device identifiers, a range of device identifiers, device identifiers that share a particular trait, such as a particular area code, etc.). Server device 230 may receive the device identifier to associate the device identifier with the application, in order to provide a toll-free data service to client device 210 via the application.

Server device 230 may receive the device identifier in the toll-free application request, in some implementations. Additionally, or alternatively, server device 230 may receive the device identifier based on client device 210 accessing the application. For example, the application may cause client device 210 to provide the device identifier to server device 230 when client device 210 accesses the application.

As further shown in FIG. 4, process 400 may include generating an application signature based on the application identifier and the device identifier (block 440). For example, server device 230 may generate an application signature using the application identifier and the device identifier. In some implementations, server device 230 may apply an encryption algorithm to the application identifier and the device identifier. For example, server device 230 may combine the application identifier and the device identifier, and may apply an encryption algorithm to the combined application identifier and device identifier.

In some implementations, server device 230 may generate the application signature based on an encryption string. For example, server device 230 may obtain (e.g., generate, receive, etc.) a string of one or more characters (e.g., a random salt, a cryptographic pepper, a padding value, etc.), and may apply the encryption algorithm to the string of one or more characters, the application identifier, and the device identifier.

In some implementations, server device 230 may generate the encryption string randomly. Additionally, or alternatively, server device 230 may generate the encryption string based on a rule (e.g., a cipher for generating encryption strings, an encryption of particular data, such as a time stamp, etc.). In some implementations, server device 230 may periodically generate the encryption string. For example, server device 230 may generate a new encryption string every minute, every day, every time a new application signature is generated, or the like. By generating the application signature based on an encryption string, server device 230 improves security of the application signature. Furthermore, by periodically generating new encryption strings, server device 230 further improves security of the application signature.

As further shown in FIG. 4, process 400 may include providing the application signature to a device that is associated with the device identifier (block 450) and returning to block 440 (e.g., periodically). For example, server device 230 may provide the application signature to client device 210 that is associated with (e.g., identified by) the device identifier. In some implementations, server device 230 may provide the application signature via a push notification, which prevents unauthorized devices (e.g., other client devices 210, etc.) from obtaining the application signature. In some implementations, server device 230 may provide the application signature periodically. For example, when server device 230 generates a new application signature, server device 230 may provide the new application signature to client device 210 (e.g., periodically).

In some implementations, server device 230 may provide an encryption string to network processing unit 220. For example, assume that server device 230 generates an application signature based on a particular device identifier, a particular application identifier, and a particular encryption string (e.g., by encrypting the particular device identifier and the particular application identifier based on the particular encryption string, by encrypting the particular device identifier, the particular application identifier, and the particular encryption string, etc.). In such cases, server device 230 may provide the particular encryption string to network processing unit 220. In some implementations, server device 230 may provide the particular encryption string in association with the particular device identifier and/or the particular application identifier, which permits network processing unit 220 to identify the particular encryption string based on information received in association with the application signature.

In some implementations, server device 230 may generate new application signatures (e.g., periodically, every minute, every ten minutes, every hour, whenever a new client device 210 runs the application, etc.). By generating new application signatures, server device 230 improves security of the toll-free data service and reduces a probability that a malicious party will compromise the encryption of the application signature. In some implementations, server device 230 may generate the new application signatures based on new encryption strings. For example, server device 230 may generate a new encryption string periodically, and may generate a new application signature based on the new encryption string. Server device 230 may provide the new encryption string to network processing unit 220, and may provide the new application signature to client device 210, which improves security of network 240 by increasing a frequency at which the application signatures and encryption strings are updated.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
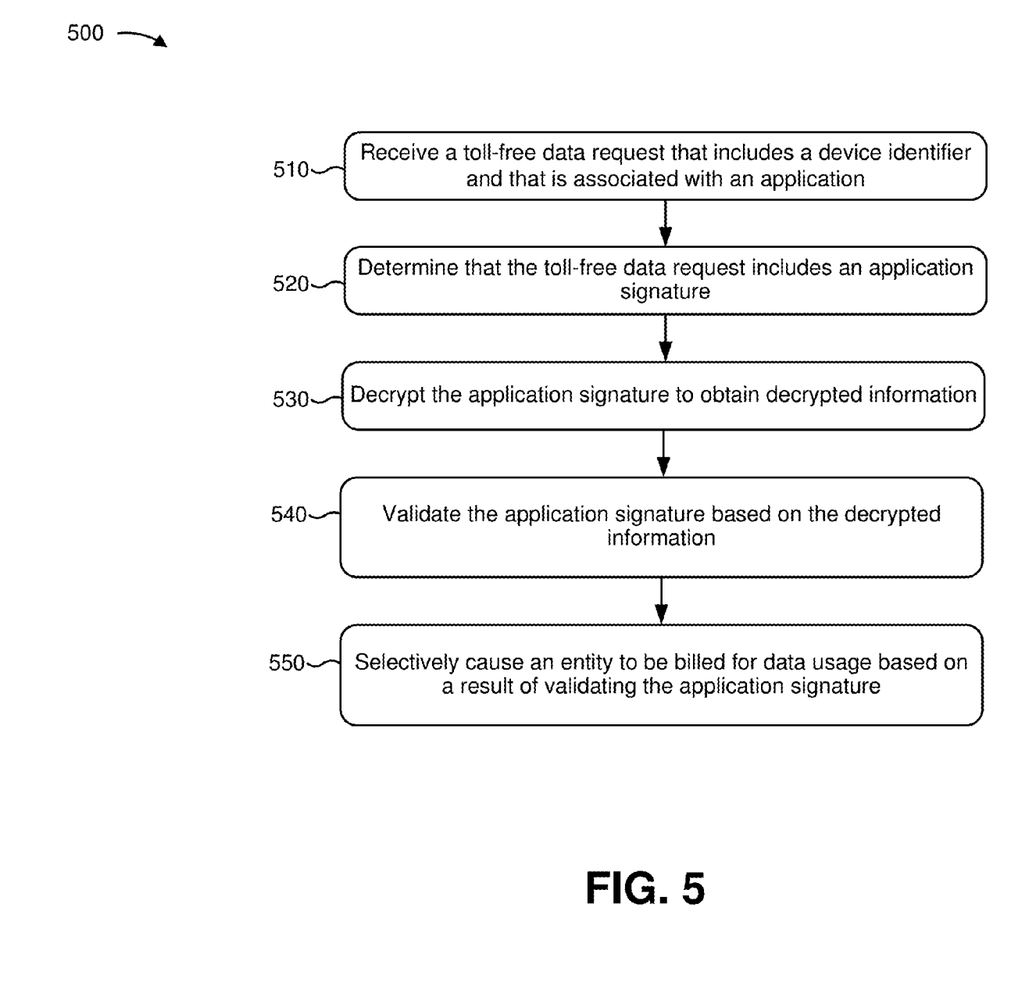
FIG. 5 is a flow chart of an example process for providing a toll-free data service for an application.

FIG. 5 is a flow chart of an example process 500 for providing a toll-free data service for an application. In some implementations, one or more process blocks of FIG. 5 may be performed by network processing unit 220. In some implementations, one or more process blocks of FIG. 5 may be performed by another device or a group of devices separate from or including network processing unit 220, such as client device 210 and server device 230.

As shown in FIG. 5, process 500 may include receiving a toll-free data request that includes a device identifier and that is associated with an application (block 510). For example, network processing unit 220 may receive a toll-free data request from client device 210. The toll-free data request may include, for example, an HTTP request, a packet, a session request, or the like. In some implementations, the toll-free data request may include a device identifier. The device identifier may identify a client device 210 that transmitted the toll-free data request. In some implementations, network processing unit 220 may determine the device identifier based on receiving the application signature from client device 210 that is associated with the device identifier.

In some implementations, the toll-free data request may be associated with an application. For example, the application may permit a user of client device 210 to access content, such as a webpage, an image, a video, a text file, or the like. When the user accesses the content via the application, the application may cause client device 210 to transmit a toll-free data request.

As further shown in FIG. 5, process 500 may include determining that the toll-free data request includes an application signature (block 520). For example, network processing unit 220 may determine that the toll-free data request includes an application signature. In some implementations, client device 210 may associate the application signature with the toll-free data request (e.g., may insert the application signature, may append the application signature to the toll-free data request, etc.). In some implementations, network processing unit 220 may detect the application signature based on a tag associated with the application signature, based on a location of the application signature in the toll-free data request, based on a format of the application signature, or the like.

As further shown in FIG. 5, process 500 may include decrypting the application signature to obtain decrypted information (block 530). For example, network processing unit 220 may decrypt the application signature to obtain decrypted information. In some implementations, network processing unit 220 may apply a decryption algorithm to the application signature to obtain the decrypted information. The decrypted information may include the application identifier, the device identifier, and/or other information.

In some implementations, network processing unit 220 may obtain an encryption string (e.g., a random salt, a cryptographic pepper, a padding value, etc.) to decrypt the application signature. In some cases, network processing unit 220 may obtain the encryption string from storage. For example, server device 230 may generate the encryption string, and may provide the encryption string to network processing unit 220. In some implementations, server device 230 may provide the encryption string in association with a device identifier and/or an application identifier. Network processing unit 220 may store the encryption string, and may obtain the encryption string based on information included in the toll-free data request (e.g., the application signature, the device identifier, etc.). Additionally, or alternatively, network processing unit 220 may obtain the encryption string corresponding to client device 210 based on receiving the toll-free data request from client device 210. By obtaining the encryption string from local storage, network processing unit 220 conserves processor power and/or network resources of network processing unit 220 and server device 230.

Additionally, or alternatively, network processing unit 220 may request the encryption string from server device 230 based on the information included in the toll-free data request received from client device 210. By requesting the encryption string based on the toll-free data request received from client device 210, network processing unit 220 conserves local storage space of network processing unit 220. Additionally, or alternatively, network processing unit 220 may generate the encryption string (e.g., based on a rule for generating encryption strings, based on information received in association with the application signature, etc.).

Network processing unit 220 may use the encryption string to decrypt the application signature. For example, network processing unit 220 may apply a decryption algorithm to the encryption string and the application signature to obtain the decrypted information. In this way, network processing unit 220 improves security of the application signature by using the encryption string to decrypt the application signature.

As further shown in FIG. 5, process 500 may include validating the application signature based on the decrypted information (block 540). For example, network processing unit 220 may validate the application signature based on the decrypted information. In some implementations, network processing unit 220 may validate the application signature based on determining whether the decrypted information includes the device identifier for client device 210 that provided the toll-free data request, and based on whether the decrypted information includes an application identifier that is associated with the application.

In some implementations, network processing unit 220 may determine whether the decrypted information includes an encryption string. For example, server device 230 may encrypt an encryption string in association with an application identifier and a device identifier. Network processing unit 220 may obtain the encryption string (e.g., by generating the encryption string, by requesting the encryption string from server device 230, by retrieving the encryption string from local storage, etc.). Network processing unit 220 may decrypt the application signature, and may determine whether the decrypted information includes the encryption string.

When the decrypted information includes the encryption string, network processing unit 220 may determine that client device 210 is to be permitted to access the toll-free content, and may cause the toll-free application provider to be billed. When the decrypted information does not include the encryption string, or includes an encryption string that does not match the obtained encryption string, network processing unit 220 may determine that client device 210 is to be denied access to the toll-free content and/or may cause client device 210 to be billed for data usage associated with the toll-free content. In some implementations, network processing unit 220 may validate the application signature by determining that the decrypted information includes a device identifier associated with client device 210, an application identifier associated with the application, and the encryption string. In this way, network processing unit 220 improves security of the toll-free content by validating the toll-free data request based on an encryption string.

As further shown in FIG. 5, process 500 may include selectively causing an entity to be billed for data usage based on a result of validating the application signature (block 550). For example, network processing unit 220 may selectively cause an entity (e.g., a subscriber associated with the toll-free data service, a subscriber associated with client device 210, etc.) to be billed for data usage in connection with the toll-free data service. In some implementations, network processing unit 220 may establish a toll-free data session with client device 210 based on the toll-free data request, and may determine a quantity of data usage to bill based on data usage in association with the toll-free data session. In some implementations, network processing unit 220 may cause server device 230 to bill the entity.

Network processing unit 220 may selectively cause the entity to be billed based on whether the decrypted information includes the device identifier associated with client device 210 that provided the toll-free data request, the application identifier for the application associated with client device 210, and/or an encryption string that is associated with client device 210. When the decrypted information includes the correct application identifier, the device identifier associated with client device 210, and the encryption string associated with client device 210, network processing unit 220 may bill a subscriber associated with the toll-free data service for data usage associated with the toll-free data request. When the decrypted information does not include the correct application identifier, the device identifier associated with client device 210, and/or the encryption string associated with client device 210, network processing unit 220 may bill a subscriber associated with client device 210.

In some implementations, network processing unit 220 may selectively cause an entity to be billed based on whether network processing unit 220 can decrypt the application signature based on an encryption string. For example, assume that an application signature is encrypted based on a first encryption string and provided to client device 210. Assume further that network processing unit 220 receives an updated encryption string. When network processing unit 220 receives the application signature from client device 210, network processing unit 220 may be unable to decrypt the application signature using the updated encryption string. Network processing unit 220 may determine that the application signature is not validated, and may cause an entity associated with client device 210 to be billed.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, a network processing unit validates application signatures based on periodically updated application signatures and encryption strings, which improves security of toll-free content to be accessed by a client device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
  one or more processors to:
    receive a toll-free data request that includes an application signature,
      the toll-free data request requesting that a first entity be billed for data usage by a second device associated with a second entity,
      the toll-free data request being received from an application running on the second device;

decrypt the application signature based on an encryption string to obtain a device identifier and an application identifier,
the encryption string being associated with the device identifier, and
the encryption string being received from a device other than the second device;
validate the application signature based on the device identifier and the application identifier; and
selectively cause the first entity or the second entity to be billed for data usage associated with the toll-free data request based on a result of validating the application signature,
the data usage being based on data transmitted via a network to the application on the second device.

2. The first device of claim 1, where the one or more processors, when validating the application signature, are to:
determine whether the device identifier is associated with the second device; and
determine whether the application identifier is associated with the application.

3. The first device of claim 1, where the encryption string includes at least one of:
a random salt,
a cryptographic pepper, or
a padding value.

4. The first device of claim 1, where the encryption string is a first encryption string; and
where the one or more processors are to:
receive a second encryption string,
the second encryption string being different than the first encryption string, and
the second encryption string being received after the first encryption string; and
where the one or more processors, when decrypting the application signature, are to:
decrypt the application signature based on the second encryption string.

5. The first device of claim 4, where the one or more processors, when receiving the second encryption string, are to:
receive the second encryption string based on a particular time interval,
the particular time interval having elapsed between the first device receiving the first encryption string and the first device receiving the second encryption string.

6. The first device of claim 1, where the one or more processors, when validating the application signature, are to:
validate the application signature based on whether the application signature, when decrypted, includes the encryption string.

7. The first device of claim 1, where the one or more processors, when receiving the toll-free data request, are to:
receive information identifying the second device in association with the toll-free data request.

8. A non-transitory computer-readable medium storing instructions, the instructions comprising:
one or more instructions that, when executed by one or more processors of a device, cause the one or more processors to:
receive a toll-free data request that includes an application signature,
the toll-free data request requesting that a first entity be billed for data usage by a second device associated with a second entity,
the toll-free data request being received from an application running on the second device;
obtain, based on a device identifier, an encryption string that is associated with the second device,
the device identifier being determined based on receiving the toll-free data request that includes the application signature;
decrypt the application signature, based on the encryption string, to obtain the device identifier and an application identifier;
validate the application signature based on the device identifier and the application identifier; and
selectively cause the first entity or the second entity to be billed for data usage associated with the toll-free data request based on a result of validating the application signature,
the data usage being based on data transmitted via a network to the application on the second device.

9. The non-transitory computer-readable medium of claim 8, where the encryption string includes one or more of:
a random salt,
a cryptographic pepper, or
a padding value.

10. The non-transitory computer-readable medium of claim 8, where the one or more instructions, that cause the one or more processors to obtain the encryption string, cause the one or more processors to:
receive the encryption string from flab another device that generated the application signature.

11. The non-transitory computer-readable medium of claim 8, where the one or more instructions, that cause the one or more processors to validate the application signature, cause the one or more processors to:
determine that the device identifier is associated with the second device; and
determine that the application identifier is associated with the application.

12. The non-transitory computer-readable medium of claim 8, where the one or more instructions, that cause the one or more processors to receive the toll-free data request, cause the one or more processors to:
receive information identifying the second device in association with the toll-free data request.

13. The non-transitory computer-readable medium of claim 8, where the one or more instructions, that cause the one or more processors to selectively cause the first entity or the second entity to be billed for data usage associated with the toll-free data request, cause the one or more processors to:
cause the first entity to be billed for the data usage associated with the toll-free data request based on the device identifier being associated with the second device and based on the application identifier being associated with the application.

14. The non-transitory computer-readable medium of claim 8, where the one or more instructions, that cause the one or more processors to selectively cause the first entity or the second entity to be billed for data usage, cause the one or more processors to:
cause the second entity to be billed for the data usage associated with the toll-free data request based on the device identifier not being associated with the second device or based on the application identifier not being associated with the application.

15. A method, comprising:
receiving, by a first device, a toll-free data request that includes an application signature, the toll-free data request requesting that a first entity be billed for data usage by a second device associated with a second entity,
the toll-free data request being received from an application running on the second device;
obtaining an encryption string,
the encryption string being associated with the second device;
decrypting, by the first device, the application signature by applying a decryption algorithm to the application signature and the encryption string to obtain a device identifier and an application identifier;
determining, by the first device, whether the device identifier is associated with the second device;
determining, by the first device, whether the application identifier is associated with the application; and
selectively causing, by the first device, the first entity or the second entity to be billed for data usage associated with the toll-free data request based on whether the device identifier is associated with the second device and based on whether the application identifier is associated with the application,
the data usage being based on data transmitted via a network to the application on the second device.

16. The method of claim 15, where obtaining the encryption string comprises:
receiving the encryption string in association with the device identifier.

17. The method of claim 15, where selectively causing the first entity or the second entity to be billed comprises:
causing the first entity to be billed for the data usage associated with the toll-free data request based on the device identifier being associated with the second device and based on the application identifier being associated with the application.

18. The method of claim 15, where selectively causing the first entity or the second entity to be billed comprises:
causing the second entity to be billed for the data usage associated with the toll-free data request based on the device identifier not being associated with the second device or based on the application identifier not being associated with the application.

19. The method of claim 15, where the encryption string is a first encryption string; and
where the method further comprises:
receiving a second encryption string,
the second encryption string being different than the first encryption string, and
the second encryption string being received after the first encryption string; and
where decrypting the application signature comprises:
decrypting the application signature based on the second encryption string.

20. The method of claim 19, where receiving the second encryption string comprises:
receiving the second encryption string based on a particular time interval,
the particular time interval having elapsed between the first device receiving the first encryption string and the first device receiving the second encryption string.

* * * * *